US011070937B2

(12) United States Patent
Greenberger et al.

(10) Patent No.: US 11,070,937 B2
(45) Date of Patent: *Jul. 20, 2021

(54) MOBILE DEVICE PATH AND USER ASSOCIATION

(71) Applicant: INTERNATIONAL BUSINESS MACHINES CORPORATION, Armonk, NY (US)

(72) Inventors: Jeremy A. Greenberger, Raleigh, NC (US); Zachary M. Greenberger, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/559,680

(22) Filed: Sep. 4, 2019

(65) Prior Publication Data
US 2019/0394611 A1   Dec. 26, 2019

Related U.S. Application Data

(63) Continuation of application No. 15/798,630, filed on Oct. 31, 2017, now Pat. No. 10,448,197, which is a
(Continued)

(51) Int. Cl.
H04W 4/021 (2018.01)
H04L 29/08 (2006.01)
(Continued)

(52) U.S. Cl.
CPC .......... H04W 4/021 (2013.01); H04L 67/18 (2013.01); H04L 67/22 (2013.01); H04L 67/306 (2013.01);
(Continued)

(58) Field of Classification Search
CPC .... H04W 4/021; H04W 84/12; H04L 67/306; H04L 67/22; H04L 67/18; H04L 67/02; H04L 61/6022
(Continued)

(56) References Cited

U.S. PATENT DOCUMENTS 7,181,465 B2   2/2007 Maze et al.
8,874,465 B2  10/2014 Heiser, III et al.
(Continued)

OTHER PUBLICATIONS

P. Mell, et al. "The NIST Definition of Cloud Computing", NIST Special Publication 800-145, Sep. 2011, Gaithersburg, MD.
(Continued)

Primary Examiner — Farid Seyedvosoghi
(74) Attorney, Agent, or Firm — Stephanie Carusillo; Matthew M. Hulihan; Heslin Rothenberg Farley & Mesiti PC

(57) ABSTRACT

Methods, computer program products, and systems are presented. The method computer program products, and systems can include, for instance: recording position data for a mobile device over time, the position data being associated to an identifier of the mobile device; outputting to a user an identification code associated to the identifier; receiving input data from a user, the input data including the identification code and user identifying information from a user; responsively to the receiving the input data from a user associating the identification code and the user identifying information; based on the associating processing the position data and user profile data associated to the user identifying information; sending a message to the user based on a result of the processing.

20 Claims, 9 Drawing Sheets

Related U.S. Application Data continuation of application No. 15/296,170, filed on Oct. 18, 2016, now Pat. No. 9,877,153.

(51) Int. Cl.
*H04L 29/12* (2006.01)
*H04W 84/12* (2009.01)

(52) U.S. Cl.
CPC .......... *H04L 61/6022* (2013.01); *H04L 67/02* (2013.01); *H04W 84/12* (2013.01)

(58) Field of Classification Search
USPC ................... 455/456.1, 456.2, 456.3, 456.6; 705/14.57, 14.58, 14.6, 14.53, 14.52, 705/14.38
See application file for complete search history.

(56) References Cited

U.S. PATENT DOCUMENTS

| | | | |
|---|---|---|---|
| 9,087,346 B2 | 7/2015 | Hartzell | |
| 9,877,153 B1 | 1/2018 | Greenberger et al. | |
| 2006/0206709 A1* | 9/2006 | Labrou | H04L 63/083 713/167 |
| 2007/0171046 A1* | 7/2007 | Diem | G06F 16/29 340/539.13 |
| 2007/0182546 A1* | 8/2007 | Virk | H04W 4/023 340/539.13 |
| 2011/0238517 A1 | 9/2011 | Ramalingam | |
| 2011/0238755 A1 | 9/2011 | Khan | |
| 2012/0109828 A1 | 5/2012 | Phillips | |
| 2012/0254428 A1* | 10/2012 | Isozaki | H04L 63/0876 709/225 |
| 2012/0276868 A1 | 11/2012 | Martell | |
| 2012/0297468 A1 | 11/2012 | Bharadwaj Subramanya | |
| 2013/0030915 A1 | 1/2013 | Statler et al. | |
| 2013/0132234 A1 | 5/2013 | Grossi et al. | |
| 2013/0167196 A1* | 6/2013 | Spencer | H04L 61/6022 726/3 |
| 2013/0339122 A1* | 12/2013 | Truitt | G06Q 30/0269 705/14.26 |
| 2014/0006191 A1* | 1/2014 | Shankar | H04L 63/107 705/18 |
| 2014/0180811 A1 | 6/2014 | Boal | |
| 2014/0231502 A1 | 8/2014 | Marisco et al. | |
| 2015/0072618 A1 | 3/2015 | Granbery | |
| 2015/0189227 A1* | 7/2015 | Du | H04N 7/152 348/14.01 |
| 2015/0296475 A1* | 10/2015 | Burroughs | H04W 56/00 455/456.1 |
| 2015/0356617 A1 | 12/2015 | Sugiyama et al. | |
| 2016/0048821 A1* | 2/2016 | Sprecher | G06Q 20/22 705/16 |
| 2016/0132891 A1* | 5/2016 | MacKinnon Keith | G06Q 20/3821 705/44 |
| 2016/0162977 A1 | 6/2016 | Conchola et al. | |
| 2017/0280324 A1* | 9/2017 | Beals | H04L 9/3263 |

OTHER PUBLICATIONS

Schellback, R. "*Customer Management instead of mom-and-pop shops.*" EurosCIS.com, Retrieved from: http//www.eurocis.com/cipp/md_eurocis/custome/pub/content.oid.5 (2010).

List of IBM Patent and/or Patent Applications treated as related for U.S. Appl. No. 16/559,680, filed Sep. 4, 2019, dated Dec. 17, 2019.

* cited by examiner

MOBILE DEVICE PATH AND USER ASSOCIATION

CROSS-REFERENCE TO RELATED APPLICATION

This application claims the benefit of priority of U.S. patent application Ser. No. 15/798,630, filed Oct. 31, 2017, entitled, "Mobile Device Path and User Association," the entirety of which is hereby incorporated herein by reference and which is a continuation of U.S. patent application Ser. No. 15/296,170 filed Oct. 18, 2016, entitled, "Mobile Device Path and User Association," the entirety of which is hereby incorporated herein by reference.

TECHNICAL FIELD

The present disclosure relates to mobile device in general and specifically to mobile device path data analytics.

BACKGROUND

Mobile device positioning systems have been proposed which employ use of IEEE 802.11 ("Wi-Fi") radio transceivers. Wi-Fi positioning systems (WPS) have been proposed where the Global Positioning System (GPS) are inadequate due to various causes including multipath and signal blockage indoors. Wi-Fi positioning takes advantage of the availability of wireless access points.

Proposed positioning techniques employing wireless access points have included techniques based on measuring the intensity of the received signal (received signal strength indication or RSSI). Typical parameters useful to geolocate the Wi-Fi hotspot or wireless access point include an access point's SSID and MAC address. Accuracy can depend on the number of positions that have been collected. A Wi-Fi hotspot database can include data correlating mobile device GPS location data with Wi-Fi hotspot MAC addresses.

Positioning techniques using one way communication short range radio signal beacons have been proposed. According to one technique a short range radio signal beacon can be disposed at a predetermined location. Receipt of the short range radio signal by a mobile device indicates that the mobile device is proximate the predetermined location.

SUMMARY

The shortcomings of the prior art are overcome, and additional advantages are provided, through the provision, in one aspect, of a method. The method can include, for example: recording position data for a mobile device over time, the position data being associated to an identifier of the mobile device; outputting an identification code associated to the identifier; receiving input data from a user, the input data including the identification code and user identifying information from a user; responsively to the receiving the input data from a user associating the identification code and the user identifying information; based on the associating processing the position data and user profile data associated to the user identifying information; sending a message to the user based on a result of the processing.

In another aspect, a computer program product can be provided. The computer program product can include a computer readable storage medium readable by one or more processing unit and storing instructions for execution by one or more processor for performing a method. The method can include for example, recording position data for a mobile device over time, the position data being associated to an identifier of the mobile device; outputting an identification code associated to the identifier; receiving input data from a user, the input data including the identification code and user identifying information from a user; responsively to the receiving the input data from a user associating the identification code and the user identifying information; based on the associating processing the position data and user profile data associated to the user identifying information; sending a message to the user based on a result of the processing.

In a further aspect, a system can be provided. The system can include, for example a memory. In addition, the system can include one or more processor in communication with the memory. Further, the system can include program instructions executable by the one or more processor via the memory to perform a method. The method can include for example, recording position data for a mobile device over time, the position data being associated to an identifier of the mobile device; outputting an identification code associated to the identifier; receiving input data from a user, the input data including the identification code and user identifying information from a user; responsively to the receiving the input data from a user associating the identification code and the user identifying information; based on the associating processing the position data and user profile data associated to the user identifying information; sending a message to the user based on a result of the processing.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
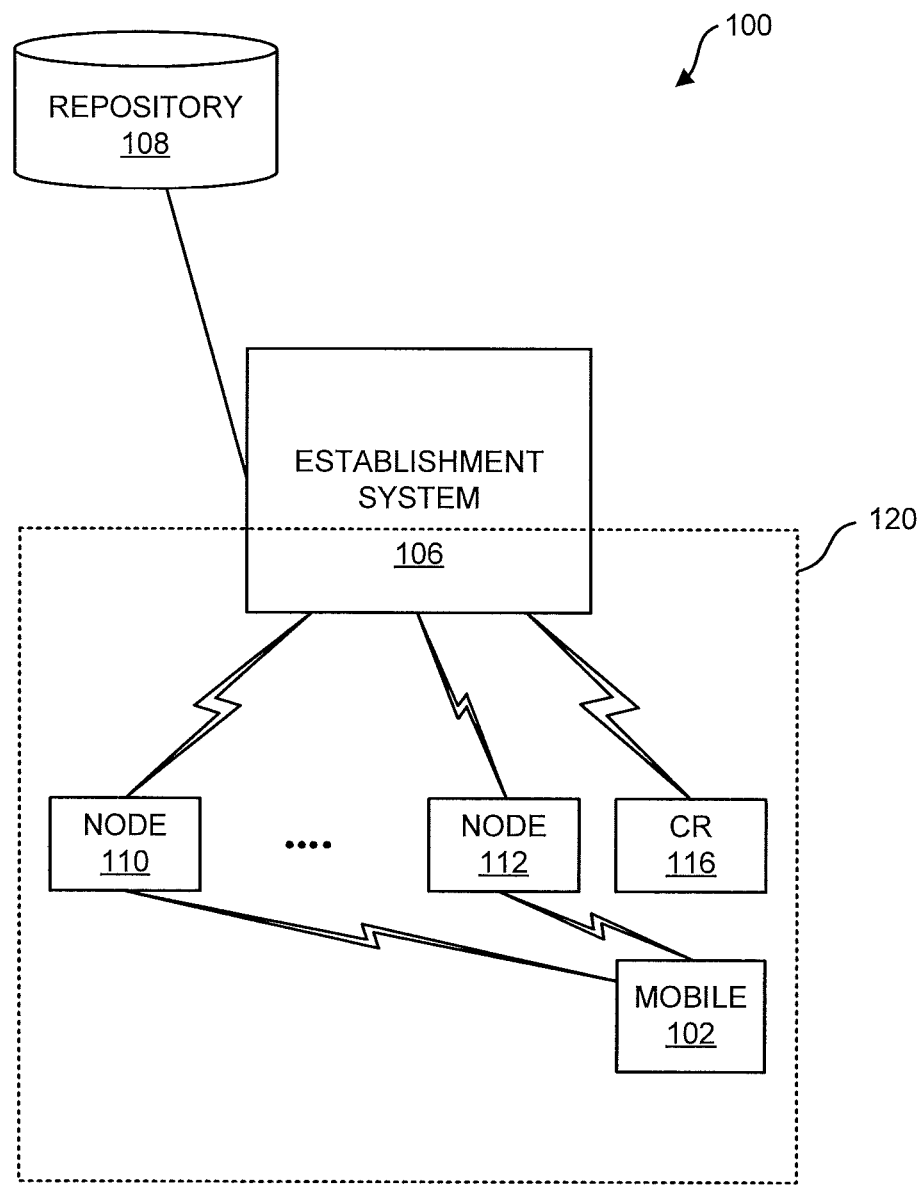
FIG. 1 depicts a system having a mobile device and an establishment system in one embodiment.

An overview of a system 100 is shown in FIG. 1. System 100 can include one or more mobile device 102 and establishment system 106 having an associated data repository 108. System 100 can also include a plurality of connection nodes such as connection node 110 and connection node 112. In one embodiment, connection node 110 and connection node 112 can be configured in accordance with a wireless local area network (LAN) communication protocol. System 100 can also include cash register 116 which like connection node 110 and connection node 112 can be in communication with establishment system 106. In one embodiment, establishment system 106 can be configured to record position data for mobile device 102 over time based on signals received from connection node 110 and connection node 112.

Border 120 indicates a region of an establishment such as a retail store or an entertainment center. Establishment system 106 can be located external to a region indicated by border 120 internal to a region or partially internal to a region indicated by border 120 and partially external from (e.g. remote from) a region indicated by border 120. In one embodiment, a common organizational entity, e.g. a retailer, an event center operator can provide establishment system 106, the establishment having a region delimited by border 120, connection node 110, connection node 112, cash register 116, within a region indicated by border 120. Establishment system 106 can be a computing node based system operated by an organizational entity e.g. a retailer, an event center operator.

Figure 7:
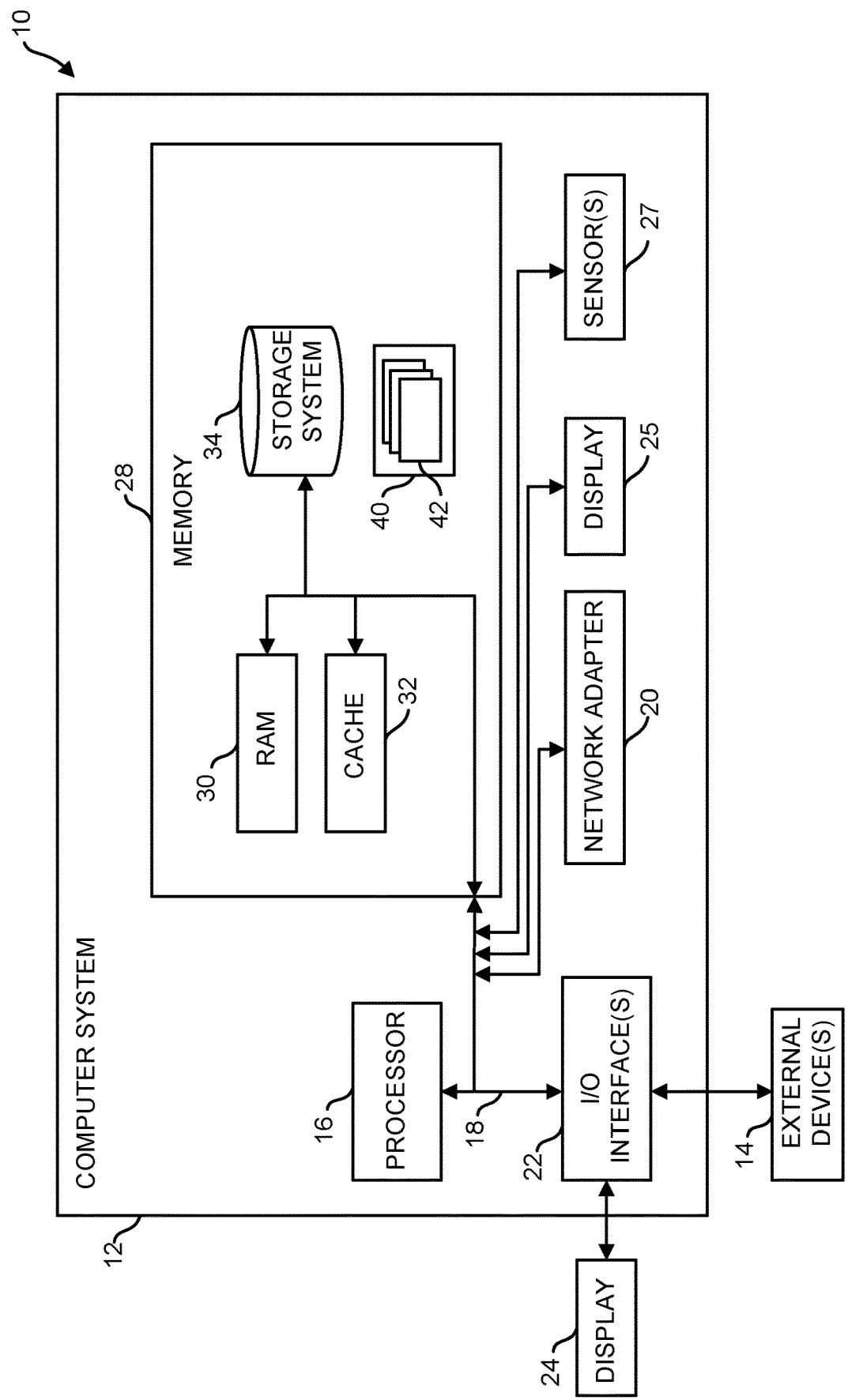
FIG. 7 depicts a computing node in one embodiment.

In one embodiment, each of one or more mobile device 102, establishment system 106, connection node 110, connection node 112, and cash register 116 can include one or more computing node 10 as set forth herein in connection with FIG. 7.

Figure 2:
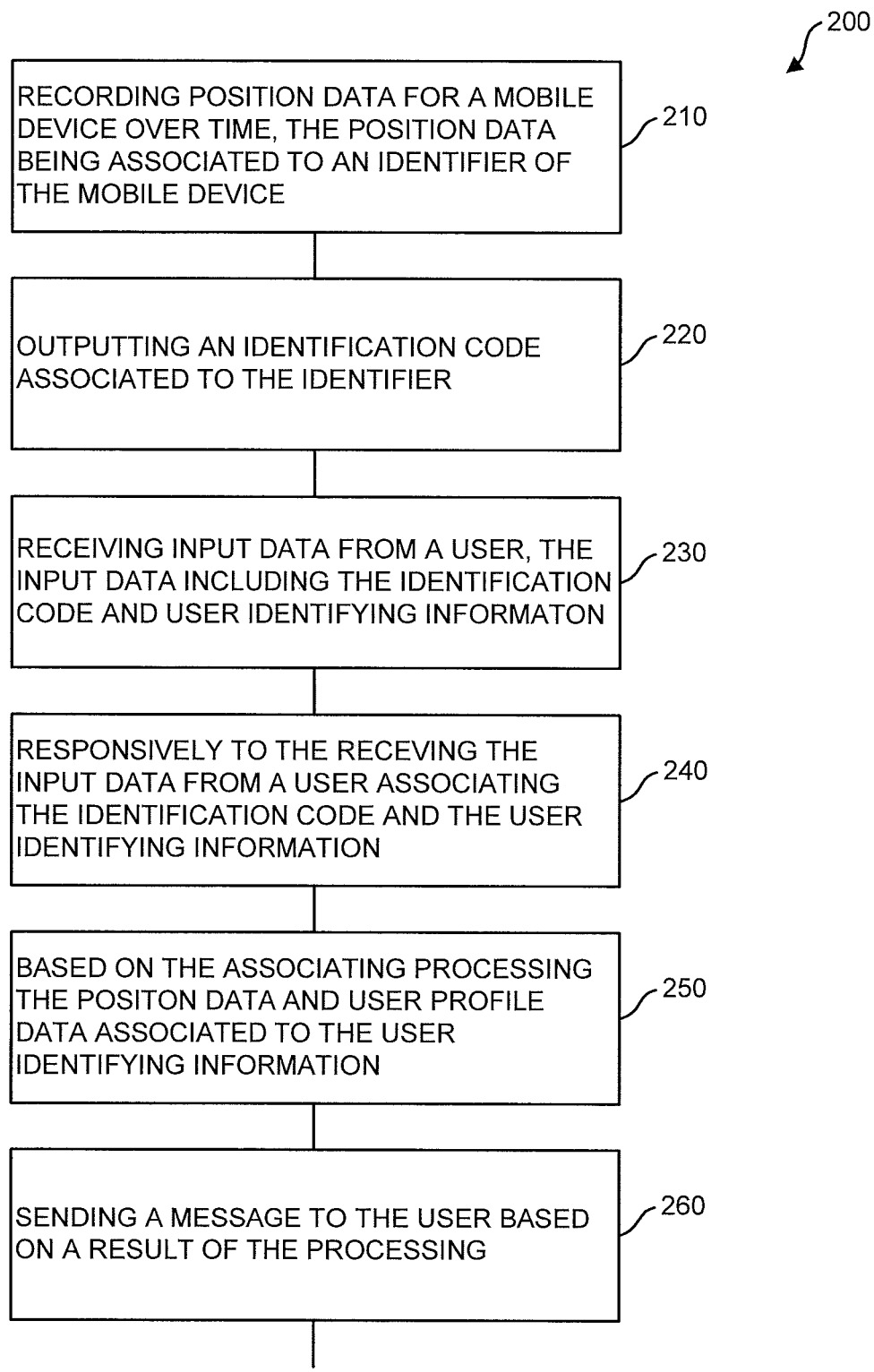
FIG. 2 depicts a flowchart depicting operation of an establishment system in one embodiment.

A method 200 that can be performed by establishment system 106 in one embodiment is illustrated with reference to FIG. 2. At block 210 method 200 can include recording position data for a mobile device over time, the position data being associated to an identifier of the mobile device. Method 200 can include at block 220 outputting an identification code associated to the identifier. Method 200 can include at block 230 receiving input data from a user, the input data including the identification code and user identifying information from a user. At block 240 method 200 can include responsively to the receiving the input data from a user associating the identification code and the user identifying information. Method can include at block 250 based on the associating processing the position data and user profile data associated to the user identifying information. At block 260 method 200 can include sending a message to the user based on a result of the processing.

Figure 3:
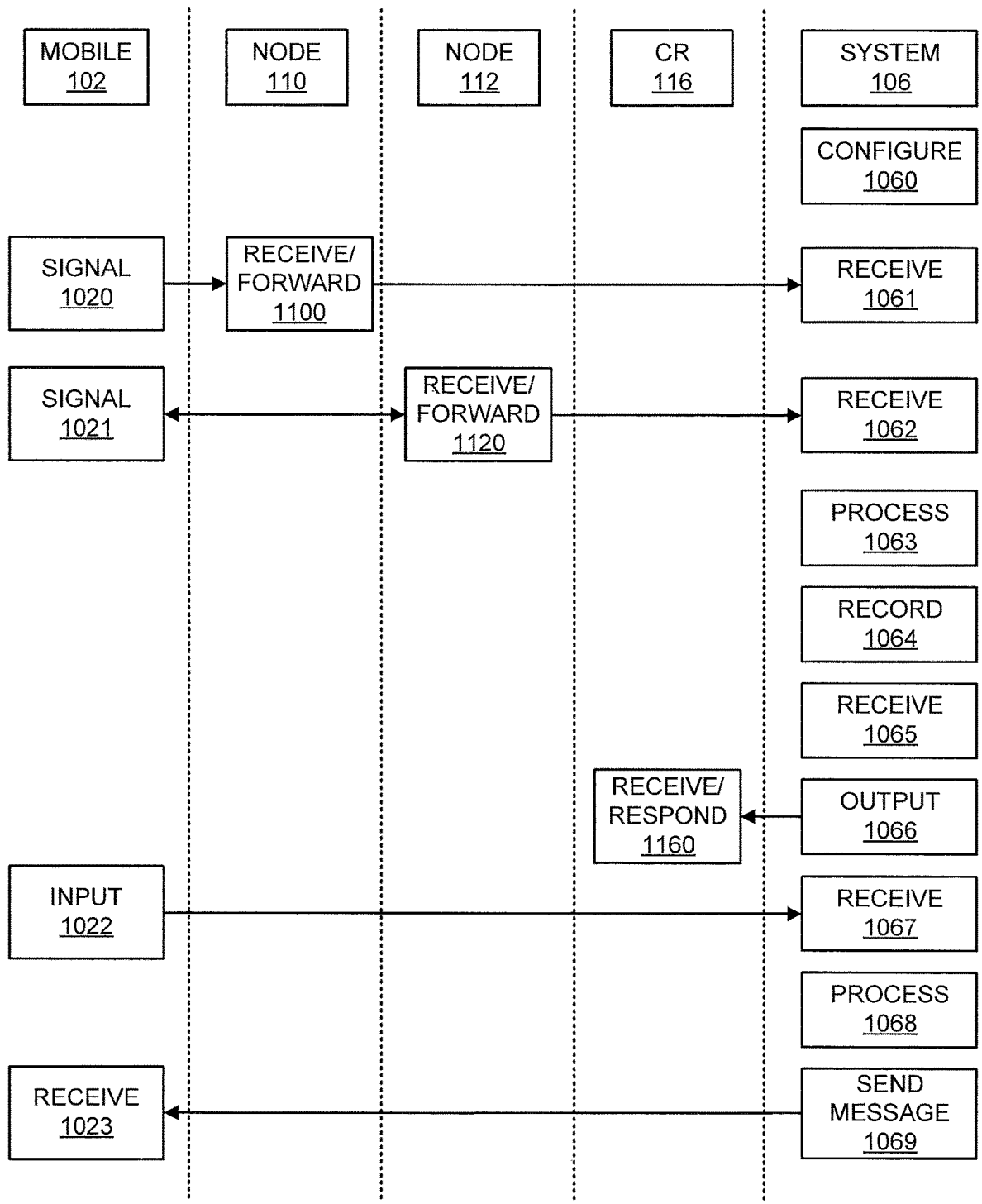
FIG. 3 is a flowchart depicting an operation of a system in one embodiment.

A flowchart illustrating operation of system 100 in one embodiment including operation of a mobile device 102 externally to and within an establishment (e.g. such as a retail store or entertainment center) is shown in FIG. 3, wherein exemplary functions are described with respect to mobile device 102, connection node 110, connection node 112, cash register 116 and establishment system 106.

At block 1061 establishment system 106 can be configured to be operational in accordance with functionalities described herein. For configuration of establishment system 106 establishment system 106 can be configured to process signals received by connection nodes 110 and 112 from mobile devices such as mobile device 102 and based on such processing can determine a coordinate position of mobile device 102. In one embodiment connection nodes 110 and 112 can be configured as IEEE 802.11 access points. Processing performed by establishment system 106 can include geolocating processing including e.g. one or more of received signal strength (RSSI) based processing, fingerprint based processing, angle of arrival processing, triangulation based processing, and time of flight based processing. In one embodiment establishment system 106 can record position data for mobile device 102 over time, i.e. position data that represents the traveled path over time (path data) of mobile device 102 through an establishment having a region indicated by border 120. In one embodiment, establishment system 106 can incorporate location services available from a location services systems integrator. According to one example locating services can be provided by GLOBAL TECHNOLOGY SERVICES® of International Business Machines Corporation based on the IBM PRESENCE INSIGHTS™ locating services platform.

Blocks 1020-1023, 1100, 1120, 1160, and 1061-1069 refer to exemplary interactions of mobile device 102 with connection nodes 110, 112 and establishment system 106 when mobile device 102 is deployed in use.

At blocks 1020-1021 mobile device 102 can be carried about an establishment by a user and while being carried mobile device send signals to connection node 110, 112 can be provided e.g. by IEEE 802.11, access points which signals can be received and forwarded for reception to establishment system 106. At block 1063 establishment system 106 can perform geolocating processing of received signals received from mobile device 102 by connection nodes 110 and 112 and based on such processing can determine position data for mobile device 102 at a current time. Processing of signals at block 1063 can include one or more of received signal strength (RSSI) based processing, fingerprint based processing, angle of arrival processing, triangulation based processing, and time of flight based processing. At block 1064 establishment system 106 can record a position of mobile device 102 over time. On receiving signals from mobile device 102 establishment system 106 can associate received signals with an identifier for the mobile device 102, e.g. a Medium Access Control (MAC) address of mobile device 102. Accordingly for position data including recorded path data establishment system 106 can record an associated MAC address associated to the position data. Recording of position data at block 1064 can include recording of position data into data repository 108.

At block 1065 a user can be checking out i.e. at a cash register (e.g. cashier attended or self-checkout station) of establishment having the region defined by border 120. During checkout establishment system 106 at block 1065 can receive an indication of payment by the user, e.g. by entry of cash into a register resolved manually or by the cash register, or by bank settlement in the case of payment by a credit card or debit card.

In response to receipt of an indication of payment, establishment system 106 at block 1066 can output a message having an identification code associated to an identifier for mobile device 102, e.g. a MAC address for mobile device 102. In one embodiment, establishment system 106 can assign a universally unique identifier (UUID) or "short code," e.g. an alphanumeric string of N (e.g. N=6) characters long to each new MAC address identified by establishment system 106 for which position data is recorded in data repository 108. In one embodiment, establishment system 106 can assign sequential serial numbers to each new MAC address identified by establishment system 106 for which position data is recorded. At block 1066 in one embodiment, establishment system 106 can output such a serial number. At block 1066 in one embodiment, establishment system 106 can output a MAC address or a code derivable from a MAC address. For output of an identification code establishment system 106 at block 1066 can send an identification code to cash register 116. For output of an identification code at block 1066, establishment system 106 can trigger the printing of a token provided e.g. by a printed purchase receipt having the identification code printed thereon.

In one embodiment, presentment by a user during payment of a customer loyalty card or payment card can be used for augmentation of user identification and/or data association processes.

In one embodiment, however, outputting of an identification code at block 1066 by establishment system 106 can be performed during performance of a cash transaction and/or without presentment of any user identification by a user. In one embodiment cash register 116 can be at a predetermined location recorded in establishment system 106, e.g. in repository 108 and at block 1066 establishment system 106 can be monitoring recently recorded timestamped data entries of establishment system 106 e.g. of repository 108 to determine if there is any mobile device 102 currently at the location of cash register 116 (e.g. within a threshold distance). Establishment system 106 can be operative in one embodiment so that outputting of an identification code at block 1066 is responsive to such monitoring wherein mobile devices at a location of checkout are monitored for. If there is a mobile device 102 at the coordinate location of cash register 116 establishment system 106 can use the identifier (e.g. recorded MAC address) for that mobile device 102 that is currently at the location of the cash register 116 for determining the identification code for outputting at block 1066. The identified code will serve as an index to all path data of mobile device 102. An outputting an identification code at block 1066 can include outputting of a message with an identification code which message in one embodiment can trigger a certain response by cash register 116, e.g. the providing of a token for handling and future presentment by a user.

Figure 6:
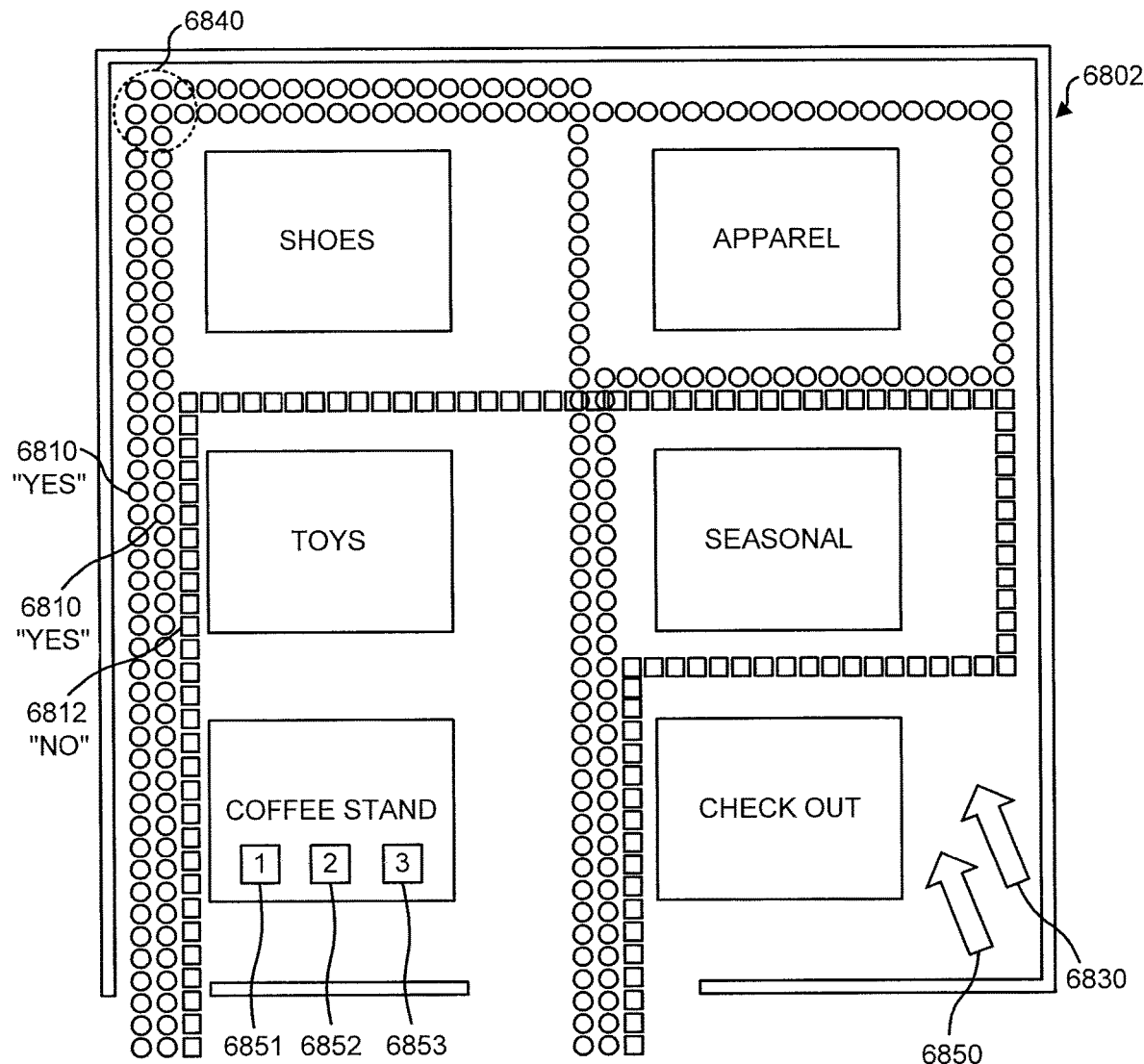
FIG. 6 is an example of an output user interface for display having visualization features that can be can be output by an establishment system in one embodiment.

In one embodiment, a location of a checkout (e.g. as may be provided by location of a cash register) can be fixed and predetermined (e.g. a cash register at a fixed location) and in another embodiment, a checkout location can be position varying, i.e. a mobile checkout. System 100 can be configured so that establishment system 106 can provide a tool allowing an administrator user to select a location of a mobile checkout. Referring to FIG. 6 an a output user interface for use by an administrator user of establishment system 106 (e.g. who may be a food server) can include a tool 6850 that allows the administrator user to select a particular restaurant (e.g. coffee stand restaurant as shown) table, e.g. table 1, 2, or 3, corresponding to buttons 6851, 6852, or 6853 (FIG. 6). Based on the selection of a location of a mobile checkout, establishment system 106 at block 1066 can be monitoring newly recorded timestamped data entries of establishment system 106 e.g. of repository 108 to determine if there is any mobile device 102 currently at the selected location selected by an administer user. Thus, at block 1066 establishment system 106 can monitor newly received position data to determine mobile devices currently at a restaurant table.

In one embodiment, output of an identification code at block 1066 can responsive to resolving, e.g. by processing recorded data of establishment system 106 which of first, second, or Nth mobile devices the mobile device identification code should be output for. In one embodiment, system 100 can be operative so that purchase information of a current transaction being performed at a checkout location may be recorded into data repository 108. Information on a current transaction can include e.g. identification of goods being purchased.

For example in one embodiment establishment system e.g. at block 1065 can be monitoring recently recorded position data recorded into repository 108 and can determine based on such monitoring that first and second mobile devices having respective first and second MAC addresses are currently at checkout location e.g. a location of cash register 116 and can further determine that each of these mobile devices having MAC addresses is associated to a particular user, e.g. by performing associating an identification code of a mobile device and user identifying information as set forth herein. In one embodiment establishment system 106 under such scenario can resolve which of the first mobile device or second mobile device a mobile device identification code should be output for at block 1066 using the transaction data for the current transaction stored in data repository 108. For example if based on a matching criteria establishment system 106 determines that there is a match between goods being purchased during a current transaction and data of a user profile for a user associated to the first mobile device, but not a match between goods being purchased during a current transaction and data of a user profile for a user associated to the second mobile device establishment system 106 can output at block 1066 the identification code for the first mobile device (e.g. according to one scenario the goods can golf clubs and user profile data of repository 108 indicates that the user associated to the first mobile device indicates golf as an interest). In one embodiment establishment system 106 can perform outputting at block 1066 responsively to resolving which of first to Nth mobile devices determined to be at a checkout location a mobile device identification code should be output for.

Figure 4:
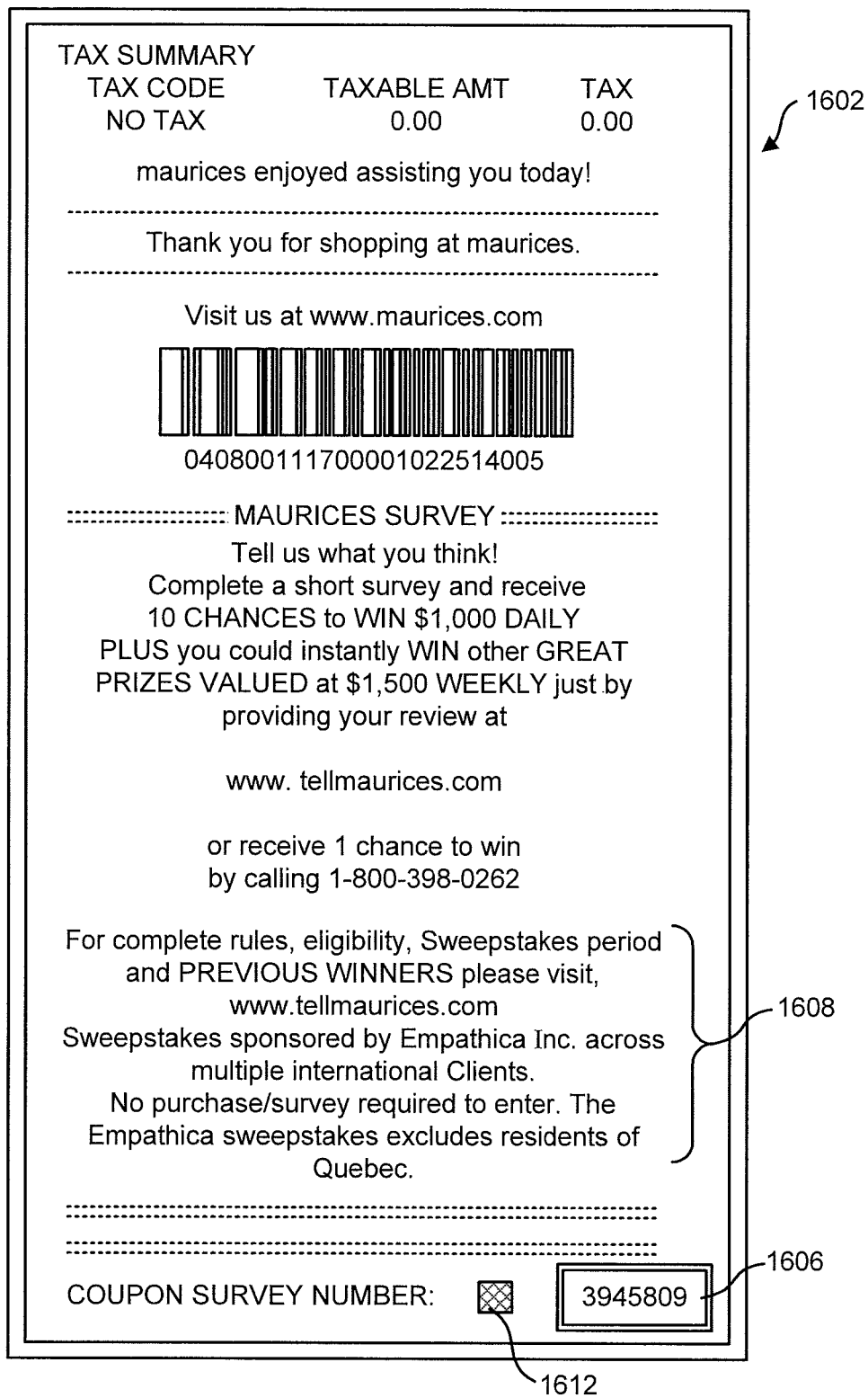
FIG. 4 is an example of a purchase receipt having an identification code in one embodiment.

At block 1160 cash register 116 for receiving an identification code can receive a message having the output identification code and at block 1160 can operate responsively to the message, e.g., by printing a token e.g. in the form of a purchase receipt with the identification code printed thereon. Such printed receipt serving as a token may include text indicating that the user can use the identification code to derive some benefit. An example of a printed purchase receipt 1602 is shown in FIG. 4. Purchase receipt 1602 can include output identification code 1606. In one embodiment, a user may be prompted by text e.g. text 1608 of the token e.g. purchase receipt 1602 to log onto an establishment website associated with the organizational entity that operates establishment system 106 and in one embodiment hosted by establishment system 106 and to input the identification code into a webpage field of the website. In one embodiment an output purchase receipt 1602 can include a decodable indicia 1612 which decodable indicia can be provided e.g. by a QR Code decodable indicia. Decodable indicia 1612 can be encoded so that a user computing system e.g. a mobile device 102 is automatically directed to the establishment website, and further so that identification code 1606 is automatically decoded from the encoded indicia and entered into the establishment website on being read by a user computer system, e.g. a mobile device 102.

Figure 5:
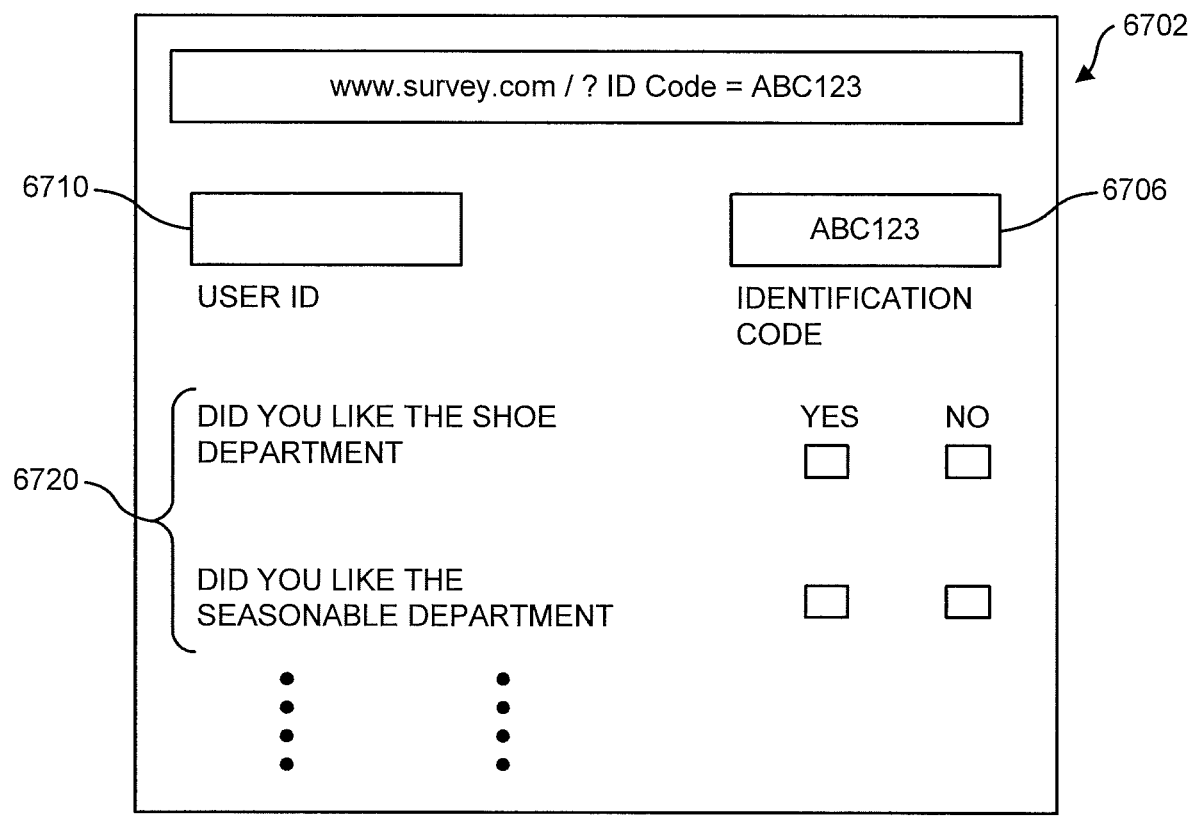
FIG. 5 is an example of an online survey form in one embodiment.

At block 1022 a user with use of mobile device 102 as shown, or with use of another computer system operated by the user can send input data to establishment system 106 and establishment system 106 at block 1067 can receive the input data. In one embodiment, the input data sent at block 1022 and received at block 1067 can include the identification code and user identifying information from a user. For sending of input data at block 1022 in one embodiment mobile device 102 (or other computer system of the user) may open a webpage having a form. An exemplary form is shown in FIG. 5. The form 6702 can be a webpage form and can include a first field 6706 for input of the identification code output at block 1066 and a second field 6710 for input of a user ID. The form in one embodiment can include a survey 6720 regarding a past, e.g. most recent trip to the establishment operated by the entity operating establishment system 106. Input data sent at block 1022 and received at block 1067 can include survey response data.

At block 1067 establishment system 106 can, responsively to the receiving the input data sent at block 1022, perform associating the identification code and the user identifying information received with the input data. Associating the identification code and the user identifying information can include determining that the identification code and the user identifying information are e.g. received in a common message, received in a common form, e.g. form 6702 (FIG. 5) when completed, received at similar times, and/or received from a common source. In one embodiment, data repository 108 can store a first table having position data including recorded path data associated to mobile device identifiers. Data repository 108 can also store a second table having user identifying information e.g. user ID associated to user profile data. At block 1067 for performing the associating establishment system 106 can index the first and second tables based on the input data sent at block 1022 and received by establishment system 106 at block 1067. User profile data can include, e.g., survey response data, preference data and/or purchase history data.

At block 1068 establishment system 106 can perform processing of the position data e.g. as recorded at block 1064 with user profile data, e.g. survey response data which can be sent at block 1022 and received at block 1067.

In one example of processing at block 1068 establishment system 106 can perform processing using position data and user profile data to identify areas of an establishment e.g. defined by border 120 having features (e.g. store displays, signage, lighting) that enhance a user's experience.

At block 1068 according to a first exemplary embodiment establishment system 106 can sort survey scores in order of satisfaction. Taking the highest N % scores for satisfaction, establishment system 106 can search recorded path of repository 108 for a common areas traveled by those users having the highest N % use satisfaction score. Common areas travelled can be identified by establishment system 106 (e.g. independent of any administrator user input) as areas having features yielding customer satisfaction. At block 1068 establishment system 106 can determine whether the current user is a user having a satisfaction score at the highest N % and can also determine whether the current user visited the identified common area traveled.

A block 1068 according to a second exemplary embodiment establishment system 106 can perform processing using position data and user profile data to provide visual representations of information including position data e.g. as recorded at block 1062. An exemplary output user interface for display having visualization effects that can be output by establishment system 106 is shown in FIG. 6. The output user interface can be output e.g. to a computing node of establishment system 106 for use by an administrator user.

Output user interface 6802 for display can include heat map wherein paths associated to user having different recorded survey responses can be presented in differentiated graphics. Referring to FIG. 6, paths of users with a "YES" response to the survey question "DID YOU LIKE THE SHOE DEPARTMENT" can be presented with a circle shaped dot pattern 6810 to indicate the user path, and paths of users with a "NO" response to the survey question "DID YOU LIKE THE SHOE DEPARTMENT" can be presented with a differentiated pattern e.g. a square shaped dot pattern 6812 as shown in FIG. 6. In one embodiment, processing at block 1068 can be further in response to administrator unit input data, e.g. as may be input into establishment system 106 using a user interface 6802 as shown in FIG. 6. For example, in one embodiment based on the output user interface 6802 for display presented, a user administrator can determine that the area indicated by map area 6840 is an area that should be visited to increase user satisfaction within a shoe department. To permit designation of such an area output user interface 6802 can include tool 6830 that allows an administrator user to designate map area 6840. An administrator user using tool 6830 to select a location of interest can be an e.g. an administrator user using a displayed user interface of establishment system 106 that is at the establishment having region defined by border 120 or can be an administrator at an external location external from an establishment having region defined by border 120. For example an administrator user can be located at a corporate headquarters of an organizational entity that provides establishment system 106.

At block 1069 establishment system 106 can send a message to a user, e.g. to mobile device 102 based on a result of the processing at block 1068. For example, in accordance with the first exemplary embodiment herinabove, on determining that the current user is not a user having a top N % user satisfaction score and that a current user has not travelled the identified common area, establishment system 106 at block 1069 can send to a user e.g. to mobile device 102 or another computer system of the user a promotional message encouraging the user to visit the common area traveled. In accordance with the second exemplary embodiment hereinabove, establishment system 106 at block 1068 based on processing of path data and user profile data and an administrator user's indication of map area 6840 as an area that should be visited, establishment system 106 at block 1069 can send to a user, e.g. to mobile device 102 or another computer system of the user a promotional message encouraging the user to visit the area indicated by map area 6840.

Certain embodiments herein may offer various technical computing advantages, including providing for associating of paths for mobile devices and users for such mobile devices. By way of particular arrangements of features e.g. one or more of connection node signal processing for determining position data for mobile devices, recording of position data, monitoring location data for mobile devices, outputting an identification code, associating a received identification code and user identifying information, processing position data and user profile data, and message sending various advantages can be provided. Processing for determining position data can include geolocating processing including e.g. one or more of received signal strength (RSSI) based processing, fingerprint based processing, angle of arrival processing, triangulation based processing, and time of flight based processing. Monitoring location data for mobile devices can include monitoring for mobile devices at a checkout location which can be a fixed checkout location or position varying checkout location. Advantages provided with combinations herein can include e.g. satisfying needs of users with improved efficiency and accuracy by output of messages to users based on processing of path data for mobile devices and user profile data of users of such mobile devices.

Figure 8:
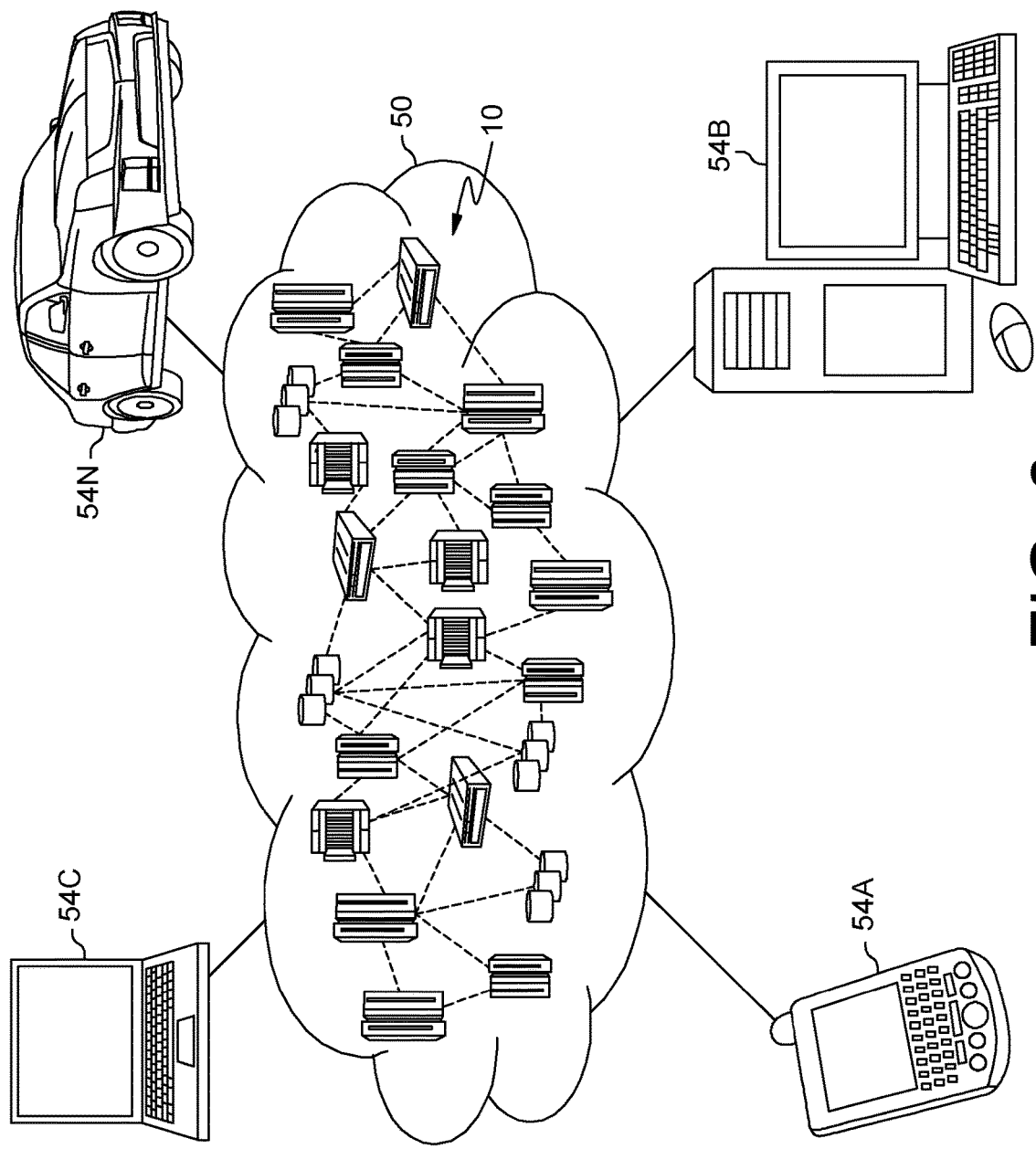
FIG. 8 depicts a cloud computing environment in one embodiment.
Figure 9:
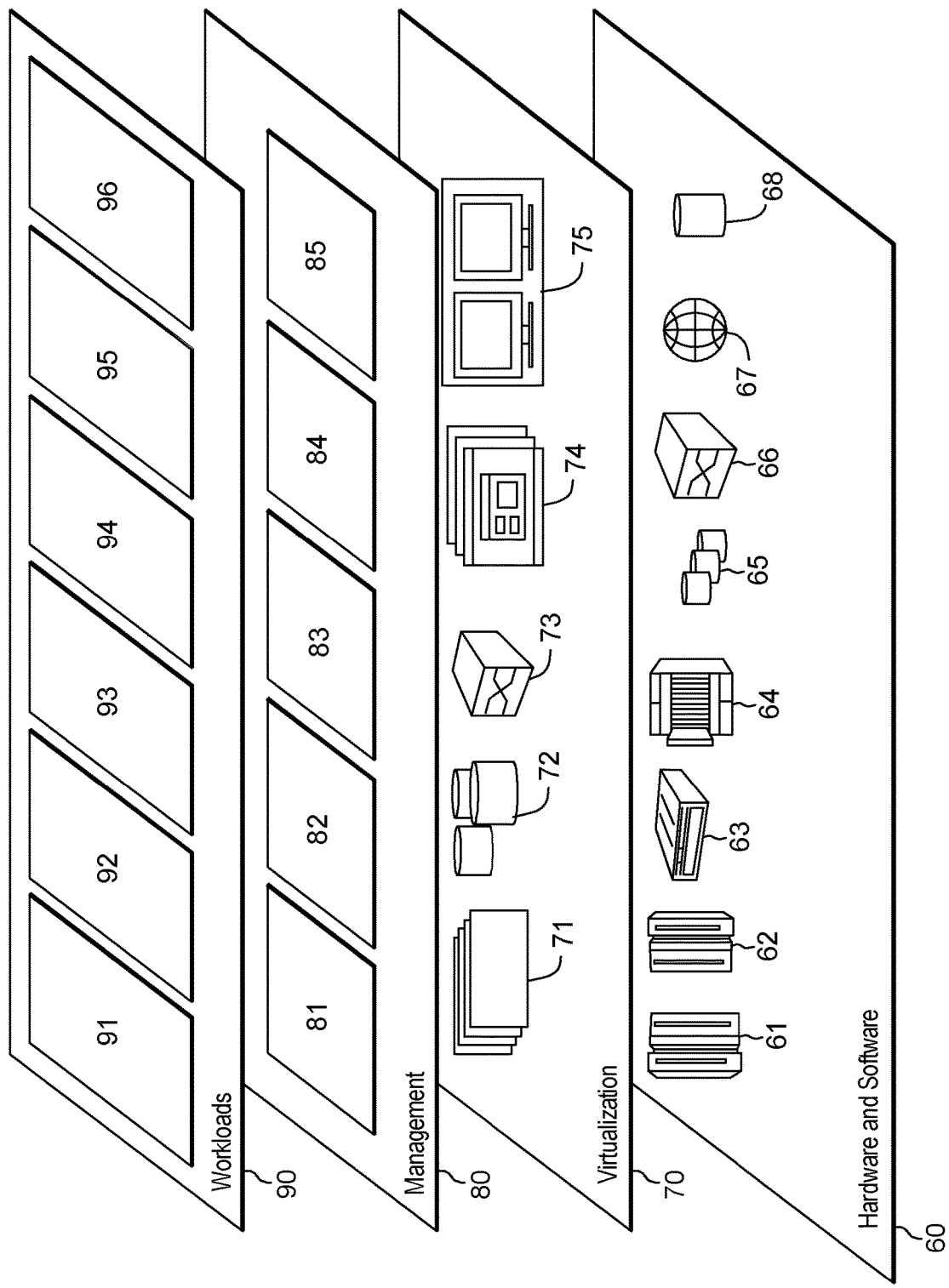
FIG. 9 depicts abstraction model layers in one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment. Each of establishment system 106, connection node 110, connection node 112, cash register 116 and mobile device 102 as set forth in FIG. 1 can include one or more computing node 10. Data repository 108 can include one or more computing node 10 external to or co-located with establishment system 106.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Mobile device 102 can be provided e.g. by a smartphone, a tablet, or a laptop computer.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein e.g. the functions set forth with reference to the flowchart of FIG. 2 which can be performed by establishment system 106, and the functions of establishment system 106, mobile device 102, connection nodes 110 and 112, and cash register 116 described with reference to the flowchart of FIG. 3.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor or an audio input device. Computer system 12 can include one or more network adapter 20. In reference to FIG. 8 below computing node 10 is implemented in a cloud environment and hence is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for path and user association as set forth herein e.g. in connection with the flowcharts of FIG. 2 and FIG. 3. The processing components 96 can be performed by one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Furthermore, a device or structure that is configured in a certain way is configured in at least that way, but may also be configured in ways that are not listed.

Included in the methods, products and systems set forth herein, there is set forth herein as follows. A1. A method comprising: recording, by one or more processor, position data for a mobile device over time, the position data being associated to an identifier of the mobile device; outputting, by the one or more processor, an identification code associated to the identifier; receiving, by the one or more processor, input data from a user, the input data including the identification code and user identifying information from a user; responsively to the receiving the input data from a user associating, by the one or more processor, the identification code and the user identifying information; based on the associating processing, by the one or more processor, the position data and user profile data associated to the user identifying information; and sending, by the one or more processor, a message to the user based on a result of the processing. A2. The method of A1, wherein the identifier of the mobile device is an identifier selected from the group consisting of a UUID and a short code. A3. The method of A1, wherein the method includes processing signals received at first and second connection nodes and determining the position data based on the processing. A4. The method of A1, wherein the receiving includes receiving the input data into a webpage form. A5. The method of A1, wherein the receiving includes receiving the input data into a webpage form, and wherein the input data includes user survey data. A6. The method of A1, wherein the user profile data includes one or more of the following selected from the group consisting of: survey data, purchase history data, and preference data. A7. The method of A1, wherein the method includes monitoring recently recorded position data for determining that the mobile device is currently at a checkout location. A8. The method of A1, wherein the method includes monitoring recently recorded position data for determining that the mobile device and a second mobile device are currently at a checkout location and performing the outputting responsive to resolving between the mobile device and the second mobile device, the resolving including using transaction data of a current transaction. A9. The method of A1, wherein the outputting includes outputting for presentment of the identification code on a purchase receipt. B1. A computer program product comprising: a computer readable storage medium readable by one or more processing unit and storing instructions for execution by one or more processor for performing a method comprising: recording position data for a mobile device over time, the position data being associated to an identifier of the mobile device; outputting an identification code associated to the identifier; receiving input data from a user, the input data including the identification code and user identifying information from a user; responsively to the receiving the input data from a user associating the identification code and the user identifying information; based on the associating processing the position data and user profile data associated to the user identifying information; and sending a message to the user based on a result of the processing. B2. The computer program product of B1, wherein the receiving includes receiving the input data into a webpage form, and wherein the input data includes user survey data. B3. The computer program product of B2, wherein the user profile data includes one or more of the following selected from the group consisting of: survey data, purchase history data, and preference data. B4. The computer program product of B2, wherein the method includes monitoring recently recorded position data for determining that the mobile device is currently at a checkout location, and wherein the outputting is performed responsively to the monitoring. B5. The computer program product of B2, wherein the outputting includes outputting for presentment of the identification code on a purchase receipt. C1. A system comprising: a memory; at least one processor in communication with memory; and program instructions executable by one or more processor via the memory to perform a method comprising: recording position data for a mobile device over time, the position data being associated to an identifier of the mobile device; outputting an identification code associated to the identifier; receiving input data from a user, the input data including the identification code and user identifying information from a user; responsively to the receiving the input data from a user associating the identification code and the user identifying information; based on the associating processing the position data and user profile data associated to the user identifying information; and sending a message to the user based on a result of the processing. C2. The system of C1, wherein the identifier of the mobile device is a MAC address. C3. The system of C1, wherein the input data is input data input into webpage form. C4. The system of C1, wherein the input data is input data input into webpage form, and wherein the input data includes user survey data. C5. The system of C1, wherein the user profile data includes one or more of the following selected from the group consisting of: survey data, purchase history data, and preference data. C6. The system of C1, wherein the outputting includes outputting for presentment of the identification code on a purchase receipt.

The corresponding structures, materials, acts, and equivalents of all means or step plus function elements in the claims below, if any, are intended to include any structure, material, or act for performing the function in combination with other claimed elements as specifically claimed. Where methods, computer program products, or systems are described as having a certain number of elements, the methods, computer program products, or systems can be practiced with less than or greater than the certain number of elements. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   recording position data for a mobile device over time to obtain path data that specifies a path of the mobile device over time, the path data being associated to an identifier of the mobile device;
   outputting to a user in human readable form an identification code, wherein the identification code is associated to the identifier;
   receiving input data from the user, the input data including the identification code and a user ID of the user, wherein the receiving input data includes receiving input data from the user into a webpage form;
      associating the identification code to the user ID responsively to the receiving input data from the user;
   based on the associating the identification code to the user ID processing the position data and user profile data associated to the user ID; and
      sending a message to the user based on a result of the processing.

2. The computer implemented method of claim 1, wherein the identifier of the mobile device is a Universally Unique Identifier (UUID) that maps to a Media Access Control Address (MAC) address of the mobile device.

3. The computer implemented method of claim 1, wherein the method includes processing signals received at first and second connection nodes and determining the position data based on the processing signals.

4. The computer implemented method of claim 1, wherein the receiving includes receiving the input data into a webpage form, and wherein the input data includes user survey data.

5. The computer implemented method of claim 1, wherein the user profile data includes one or more of the following selected from the group consisting of: survey data, purchase history data, and preference data, wherein the processing performed based on the associating the identification code to the user ID includes accessing the path data and the user profile data from a data repository in response to the receiving input data from the user.

6. The computer implemented method of claim 1, wherein the associating the identification code to the user ID responsively to the receiving input data from the user includes initiating an association of the identification code to a user ID of the user within a data structure so that the path data of the mobile device is linked to the user in response to the receiving input data from the user.

7. The computer implemented method of claim 1, wherein the recording position data for a mobile device over time to obtain path data that specifies a path of the mobile device over time includes recording in a data repository position data for a MAC address of the mobile device over time to obtain path data that specifies a path of the mobile device, wherein the method includes assigning an alphanumeric string to the MAC address, the alphanumeric string defining the identification code.

8. The computer implemented method of claim 1, wherein the receiving input data from the user includes receiving through a user interface input data from a user, the input data that is input by the user and received through the user interface including the identification code associated to the identifier of the mobile device and the user ID.

9. The computer implemented method of claim 1, wherein the outputting includes printing the identification code in text based human readable form on a purchase receipt.

10. The computer implemented method of claim 1, wherein the processing includes using the path data that specifies a path of the mobile device over time and user profile data of the user, wherein the path data that specifies a path of the mobile device over time is associated to the identification code which identification code has been associated to the user ID responsively to performing of the associating.

11. The computer implemented method of claim 1, wherein the method includes performing the outputting so that the identification code associated to the identifier is output to the user in text based human readable form in response to the user performing a purchase transaction at a cash register.

12. The computer implemented method of claim 1, wherein the method includes responsive to a purchase transaction occurring at a cash register, performing the outputting so that the identification code associated to the identifier is an identification code for a mobile device determined by monitoring of received location data to be at a location of a cash register, and wherein the outputting includes initiating providing of a printed token to the user for handling by the user, the printed token including thereon in user visible form the identification code, wherein the receiving input data from the user includes receiving through a user interface input data from a user includes receiving the identification code and the user ID into a webpage form, the webpage form having a field for input by the user of the identification code and a field for input by the user the user ID, wherein the method includes.

13. The computer implemented method of claim 1, wherein the method includes monitoring recently recorded position data for determining that the mobile device and a second mobile device are currently at a checkout location at which a checkout is being performed and performing the outputting responsive to resolving between the mobile device and the second mobile device as to which mobile device the checkout pertains, the resolving including using transaction data of a current transaction.

14. The computer implemented method of claim 1, wherein the outputting includes initiating providing of a printed token to the user for handling by the user, the printed token including thereon in human readable form the identification code, wherein the associating responsively to the receiving through the input data from the user includes using data of a first data structure and a second data structure, wherein the first data structure associates identifiers of mobile devices to paths of the mobile devices and the second data structure associates user IDs to user profiles, wherein the receiving input data from the user includes receiving the identification code and the user ID into a webpage form defining a user interface, the webpage form having a field for input by the user of the identification code and a field for input by the user the user ID.

15. The computer implemented method of claim 1, wherein the identifier is provided by a MAC address of the mobile device, wherein the outputting includes initiating providing of a printed token to the user for handling by the user, the printed token being provided by a purchase receipt and including thereon in user visible form the identification code, and wherein the receiving input data from the user includes receiving through a user interface the identification code and the user ID, the user interface defined by a webpage form having a field for input by the user of the identification code and a field for input by the user the user ID.

16. The computer implemented method of claim 1, wherein the outputting includes initiating providing of a printed token to the user for handling by the user, the printed token including thereon in user visible form the identification code, wherein the receiving input data from the user includes receiving the identification code and the user ID into a displayed user interface.

17. The computer implemented method of claim 1, wherein the method includes responsive to a purchase transaction occurring at a cash register, performing the outputting so that the identification code associated to the identifier is an identification code for a mobile device determined by monitoring of received location data to be at a location of the cash register, and wherein the outputting includes initiating providing of a printed token to the user for handling by the user, the printed token including thereon in user visible form the identification code.

18. A computer program product comprising: a computer readable storage medium readable by one or more processing circuit and storing instructions for execution by one or more processor for performing a method comprising:
recording position data for a mobile device over time to obtain path data that specifies a path of the mobile device over time, the path data being associated to an identifier of the mobile device; outputting to a user in human readable form an identification code, wherein the identification code is associated to the identifier;
    receiving input data from the user, the input data including the identification code and a user ID of the user, wherein the receiving input data includes receiving input data from the user into a webpage form;
    associating the identification code to the user ID responsively to the receiving input data from the user;
based on the associating the identification code to the user ID processing the position data and user profile data associated to the user ID; and
    sending a message to the user based on a result of the processing.

19. A system comprising:
a memory;
at least one processor in communication with the memory; and
program instructions executable by one or more processor via the memory to perform a method comprising:
recording position data for a mobile device over time to obtain path data that specifies a path of the mobile device over time, the path data being associated to an identifier of the mobile device;
outputting to a user in human readable form an identification code, wherein the identification code is associated to the identifier;
receiving input data from the user, the input data including the identification code and a user ID of the user, wherein the receiving input data includes receiving input data from the user into a webpage form;
    associating the identification code to the user ID responsively to the receiving input data from the user;
based on the associating the identification code to the user ID processing the position data and user profile data associated to the user ID; and
    sending a message to the user based on a result of the processing.

20. The system of claim 19, wherein the method includes responsive to a purchase transaction occurring at a cash register, performing the outputting so that the identification code associated to the identifier is an identification code for a mobile device determined by monitoring of received location data to be at a location of the cash register, and wherein the outputting includes initiating providing of a printed token to the user for handling by the user, the printed token including thereon in user visible form the identification code.

* * * * *